United States Patent
Connolly et al.

(10) Patent No.: US 12,115,897 B2
(45) Date of Patent: Oct. 15, 2024

(54) HOIST SYSTEM COUNTERBALANCE VALVE SIGNAL SHUTOFF

(71) Applicant: Caterpillar Inc., Peoria, IL (US)

(72) Inventors: John R. Connolly, Clayton (NC); Aleem Junaidi, Edwards (IL); Jun Wen, Oro Valley (AZ)

(73) Assignee: Caterpillar Inc., Peoria, IL (US)

( * ) Notice: Subject to any disclaimer, the term of this patent is extended or adjusted under 35 U.S.C. 154(b) by 709 days.

(21) Appl. No.: 17/379,745

(22) Filed: Jul. 19, 2021

(65) Prior Publication Data

US 2023/0017953 A1   Jan. 19, 2023

(51) Int. Cl.
*B60P 1/16* (2006.01)
*E02F 9/22* (2006.01)

(52) U.S. Cl.
CPC .............. *B60P 1/162* (2013.01); *B60P 1/165* (2013.01); *E02F 9/2246* (2013.01);
(Continued)

(58) Field of Classification Search
CPC ....... B60P 1/162; B60P 1/165; F15B 11/0445; F15B 21/087; F15B 2211/327; F15B 2211/355; F15B 2211/50581; F15B 2211/528; F15B 2211/6336; F15B 2211/6343; F15B 2211/6346; F15B 2211/6355; F15B 2211/67;
(Continued)

(56) References Cited

U.S. PATENT DOCUMENTS

| | | | | |
|---|---|---|---|---|
| 4,914,913 A | * | 4/1990 | St. Germain | B62D 5/09 60/462 |
| 8,752,372 B2 | | 6/2014 | Ramler et al. | |

(Continued)

FOREIGN PATENT DOCUMENTS

| | | |
|---|---|---|
| AU | 199943446 A1 | 3/2000 |
| CN | 204432476 U | 7/2015 |

(Continued)

OTHER PUBLICATIONS

Written Opinion and International Search Report for Int'l. Patent Appln. No. PCT/US2022/037276, mailed Oct. 31, 2022 (14 pgs).

*Primary Examiner* — Hilary L Gutman
(74) *Attorney, Agent, or Firm* — von Briesen & Roper, s.c.

(57) ABSTRACT

A hoist valve assembly for a work machine cylinder includes a main control valve, a counterbalance valve and a counterbalance shutoff valve. A main control valve raise position connects a head end of the cylinder with a pressurized fluid source and a rod end of the cylinder to a low pressure reservoir to extend the cylinder. The counterbalance valve is between the rod end and the main control valve, is biased to a closed position and has an open position connecting the rod end to the low pressure reservoir. Rod end and head end pressure signals apply force to the counterbalance valve toward the open position. The counterbalance shutoff valve is positioned between the head end and the counterbalance valve, and has a normal position to apply the head end pressure signal to the counterbalance valve and a shutoff position that blocks the head end pressure signal from the counterbalance valve.

20 Claims, 8 Drawing Sheets

(52) U.S. Cl.
CPC .......... *E02F 9/2267* (2013.01); *E02F 9/2285* (2013.01); *E02F 9/2289* (2013.01)

(58) Field of Classification Search
CPC ...... F15B 2211/7053; F15B 2211/8613; E02F 9/2246; E02F 9/2267; E02F 9/2285; E02F 9/2289
USPC ...................................................... 298/22 C
See application file for complete search history.

(56) References Cited

U.S. PATENT DOCUMENTS

| | | | |
|---|---|---|---|
| 9,533,661 | B1 | 1/2017 | Farmer et al. |
| 9,663,012 | B2 | 5/2017 | Vitale et al. |
| 9,878,737 | B2 * | 1/2018 | McIlheran ............. B62D 5/065 |
| 10,323,663 | B2 | 6/2019 | Wang et al. |
| 10,590,962 | B2 | 3/2020 | Coolidge et al. |
| 2007/0068724 | A1 * | 3/2007 | Anderson .............. B62D 12/00 180/418 |
| 2017/0204886 | A1 * | 7/2017 | Wang .................... B66C 13/066 |
| 2017/0328380 | A1 * | 11/2017 | Coolidge ............ F15B 13/0417 |
| 2018/0180066 | A1 * | 6/2018 | Rygaard Hansen .... F15B 11/10 |
| 2020/0190770 | A1 | 6/2020 | Nakajima |
| 2020/0223476 | A1 * | 7/2020 | Mate ........................ B62D 1/22 |
| 2021/0102358 | A1 | 4/2021 | Fulcher et al. |

FOREIGN PATENT DOCUMENTS

| | | | |
|---|---|---|---|
| CN | 105849421 | | 8/2016 |
| CN | 108561352 | | 9/2018 |
| EP | 2639104 | A1 | 9/2013 |
| EP | 3104022 | B1 | 12/2019 |
| JP | 2006347212 | A * | 12/2006 |
| JP | 2023115701 | A * | 8/2023 .............. E02F 3/422 |
| WO | WO-9209810 | A1 * | 6/1992 ............. E02F 9/2225 |
| WO | WO-2019157429 | A1 * | 8/2019 ............. E02F 9/2225 |

* cited by examiner

HOIST SYSTEM COUNTERBALANCE VALVE SIGNAL SHUTOFF

TECHNICAL FIELD

The present disclosure relates generally to dump trucks and, more particularly, to counterbalance valve shutoff in a dump body hoist system of a dump truck during unstable operating conditions.

BACKGROUND

Dump trucks are used for transport of material from one place to another. One such use may include transport of mined material from an extraction site to a processing site. A dump truck generally includes a load carrying container such as a dump body that holds the material. The dump truck may discharge the material by extending hoist cylinders to tilt the load carrying container and allowing the material to slide out of the load carrying container under the influence of gravitational forces.

In certain environments, the nature of the transported material may resist sliding out of the load carrying container until the container is raised to an extreme position. For example, large mining dump trucks operating in the oil sands region of Alberta, Canada, will dump high grade oil sand ore into open hoppers for processing. During the body raise event, the sticky ore payload can adhere together and adhere to the surface of the dump body and stay within the dump body for greater than 70% of the maximum dump body angle of the dump body. When the payload eventually releases from the dump body as a cohesive "loaf" at between 85% and 90% of the full dump body angle, the combined dump body weight and the payload center of gravity of the loaf can cause an over-center effect on the hoist cylinders. The over-center effect can shift the hoist cylinder load from a compressive push load with high head end pressures and low rod end pressures to a tensile pull load with high rod end pressures and low head end pressures. The hoist hydraulic system absorbs the over-center loading energy by increasing the rod end pressure to resist the over-center effect. One method currently used to increase the rod end pressure is through the use of a counterbalance valve that closes when a head end signal pressure reduces to near zero and allows the rod end pressure to increase, much like a relief valve. However, with cold oil or other external issues, the head end signal pressure acting on the counterbalance valve may not reduce to zero and may instead oscillate, thereby causing the counterbalance valve to become unstable and not provide enough rod end pressure to absorb the loafing load. With that, the operator may feel a potentially violent jarring effect after the loafing event.

An example of a hydraulic circuit for controlling hoist or lift cylinders is provided in U.S. Pat. No. 8,752,372 to Ramler et al. discloses an articulated dump truck provided with an electro-hydraulic bin control system including a proportional control valve for the bin lift cylinders and including a solenoid-operated regenerative valve assembly mounted adjacent the lift cylinders and being actuated, during lifting the bin for dumping a load of material from the bin, to cause a regenerative flow to occur when the force required by the bin lift cylinders to continue lifting the bin falls to a predetermined force. The force required for tilting the bin is continuously calculated by an electronic control unit taking into account a sensed bin load, a sensed bin tip amount and a sensed side-to-side inclination of the bin.

SUMMARY OF THE DISCLOSURE

In one aspect of the present disclosure, a hoist valve assembly for a cylinder of a work machine having a head end and a rod end is disclosed. The hoist valve assembly may include a main control valve having a raise position wherein the head end of the cylinder is in fluid communication with a pressurized fluid source and is in fluid communication with a counterbalance pilot pressure passage to transmit a head end pressure pilot signal, wherein the rod end of the cylinder is in fluid communication with a low pressure reservoir. The hoist valve assembly may further include a counterbalance valve positioned in a fluid flow path between the rod end of the cylinder and the main control valve, wherein the counterbalance valve is biased to a closed position that prevents fluid flow from the rod end to the low pressure reservoir and has an open position where the rod end of the cylinder is in fluid communication with the low pressure reservoir, and wherein a rod end pressure pilot signal from the rod end and the head end pressure pilot signal from the head end apply a force to the counterbalance valve in a direction of the open position. The hoist valve assembly may also include a counterbalance shutoff valve positioned along the counterbalance pilot pressure passage between the main control valve and the counterbalance valve, wherein the counterbalance shutoff valve has a normal position where the head end pressure pilot signal applies the force to the counterbalance valve and a shutoff position where the head end pressure pilot signal is blocked from the counterbalance valve.

In another aspect of the present disclosure, a work machine is disclosed. The work machine may include a main frame, a dump body pivotally connected to the main frame by a dump body shaft, and a hoist cylinder having a head end and a rod end and being pivotally connected to the main frame and to the dump body such that the hoist cylinder extends to rotate the dump body about the dump body shaft to raise the dump body and retracts to lower the dump body during a load dump cycle. The work machine may further include a hoist valve assembly having a main control valve, and counterbalance valve and a counterbalance shutoff valve. The main control valve may have a raise position wherein the head end of the hoist cylinder is in fluid communication with a pressurized fluid source and is in fluid communication with a counterbalance pilot pressure passage to transmit a head end pressure pilot signal, and wherein the rod end of the hoist cylinder is in fluid communication with a low pressure reservoir. The counterbalance valve may be positioned in a fluid flow path between the rod end of the hoist cylinder and the main control valve, may be biased to a closed position that prevents fluid flow from the rod end to the low pressure reservoir and has an open position where the rod end of the hoist cylinder is in fluid communication with the low pressure reservoir, and a rod end pressure pilot signal from the rod end and the head end pressure pilot signal from the head end may apply a force to the counterbalance valve in a direction of the open position. The counterbalance shutoff valve may be positioned along the counterbalance pilot pressure passage between the main control valve and the counterbalance valve, may have a normal position where the head end pressure pilot signal applies the force to the counterbalance valve and a shutoff position where the head end pressure pilot signal is blocked from the counterbalance valve, and may comprise an actuator that is actuated to move the counterbalance shutoff valve from the normal position to the shutoff position. The work machine may also include a controller operatively connected to the actuator of the counterbalance shutoff valve, and the controller being programmed to determine whether the work machine is operating under unstable operating conditions, and to actuate the actuator of the counterbalance shutoff valve to move the counterbalance shutoff valve to the shutoff position in response to determining that the work machine is operating under the unstable operating conditions.

In a further aspect of the present disclosure, a method for shutting off counterbalancing during extension of a hydraulic cylinder of a work machine is disclosed. The work machine may include a hoist valve assembly having a main control valve with a raise position wherein a head end of the hydraulic cylinder is in fluid communication with a pressurized fluid source and is in fluid communication with a counterbalance pilot pressure passage to transmit a head end pressure pilot signal, and wherein a rod end of the hydraulic cylinder is in fluid communication with a low pressure reservoir. The hoist valve assembly may also include a counterbalance valve positioned in a fluid flow path between the rod end of the hydraulic cylinder and the main control valve, wherein the counterbalance valve is biased to a closed position that prevents fluid flow from the rod end to the low pressure reservoir and has an open position where the rod end of the hydraulic cylinder is in fluid communication with the low pressure reservoir, and wherein a rod end pressure pilot signal from the rod end and the head end pressure pilot signal from the head end apply a force to the counterbalance valve in a direction of the open position. The hoist valve assembly may further include a counterbalance shutoff valve positioned along the counterbalance pilot pressure passage between the main control valve and the counterbalance valve, wherein the counterbalance shutoff valve has a normal position where the head end pressure pilot signal applies the force to the counterbalance valve and a shutoff position where the head end pressure pilot signal is blocked from the counterbalance valve, and wherein the counterbalance shutoff valve comprises an actuator that is actuated to move the counterbalance shutoff valve from the normal position to the shutoff position. The method for shutting off counterbalancing may include determining whether the work machine is commanded to move the main control valve to the raise position, determining whether the work machine is operating under unstable operating conditions in response to determining that the work machine is commanded to move to the raise position, and actuating the actuator of the counterbalance shutoff valve to move the counterbalance shutoff valve to the shutoff position in response to determining that the work machine is operating under the unstable operating conditions.

Additional aspects are defined by the claims of this patent.

DETAILED DESCRIPTION

Figure 1:
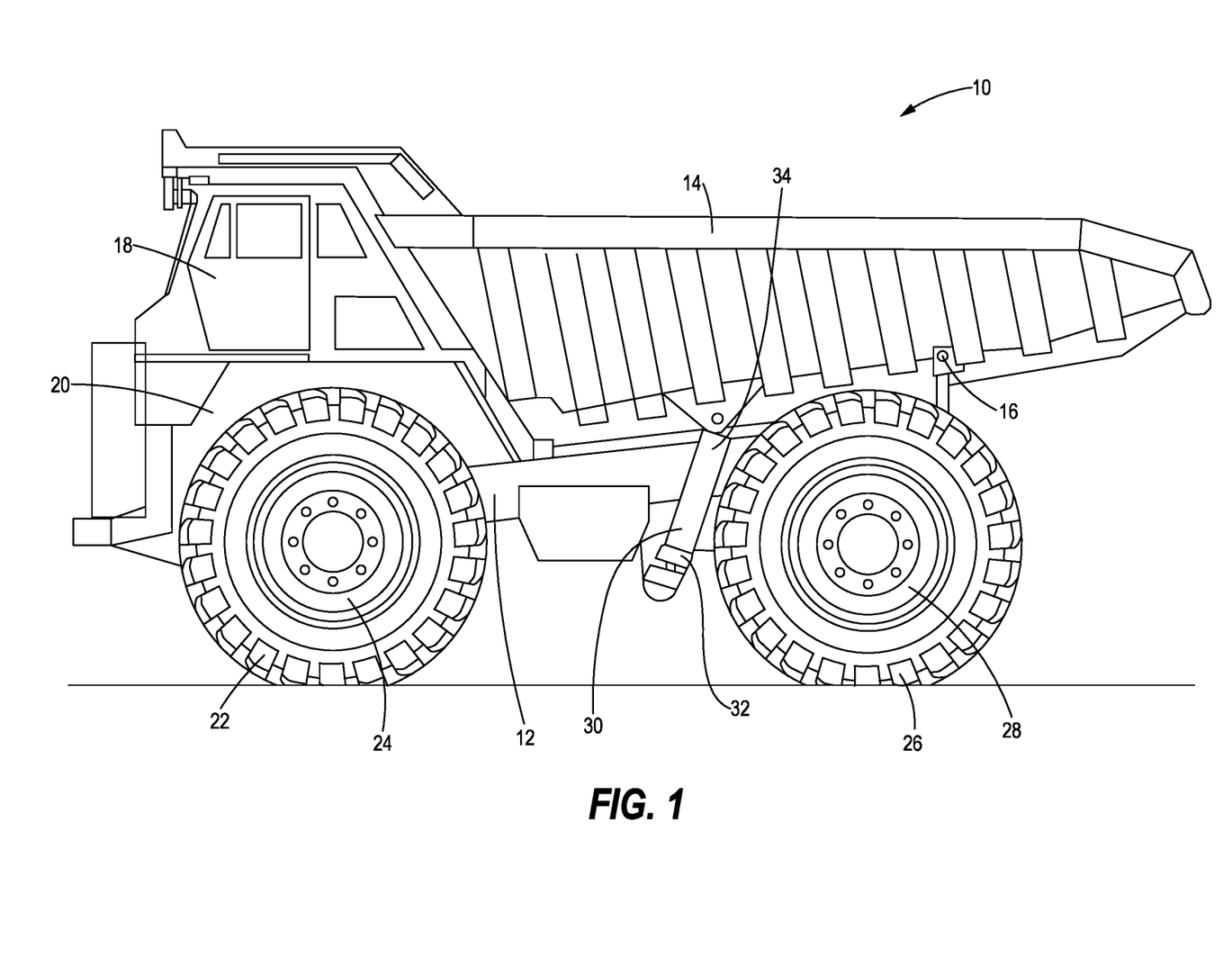
FIG. 1 is a side view of a work machine in which hoist system counterbalance valve shutoff in accordance with the present disclosure may be implemented.

FIG. 1 illustrates one example of a work machine 10 that may incorporate hoist system counterbalance valve shutoff in accordance with the present disclosure. The work machine 10 may be autonomous, that is remote controlled or having programmed movement, may be semi-autonomous (having partially remote controlled or programmed functions), or may be manually operated. The work machine 10 generally includes a main frame 12, a dump body 14 pivotally mounted to the main frame 12 by a dump body shaft 16 for rotation about a dump body axis defined by the dump body shaft 16, and a cab 18 mounted on the front of the main frame 12 above an engine enclosure 20. The work machine 10 is supported on the ground by front tires 22 (one shown) each mounted on one of two front wheel assemblies 24, and rear tires 26 (one shown) each mounted on one of two rear drive wheel assemblies 28. One or more engines (not shown) may be housed within the engine enclosure 20 to supply power to the drive wheel assemblies 28 via a mechanical or electric drive train, and to provide power for electrical systems, hydraulic systems and other systems of the work machine 10.

As discussed, the dump body 14 may rotate about the dump body shaft 16. The dump body 14 may rotate between a normal downward position as shown in FIG. 1 and a hoisted position (not shown) to dump a load of material that has been deposited in the dump body 14 by another work machine (not shown). The dump body 14 may be moved between the downward position and the hoisted position by one or more hoist cylinders 30 (one shown) each having a rod end 32 pivotally connected to the main frame 12 and a head end 34 pivotally connected to the dump body 14. In other implementations, the rod end 32 may be pivotally connected to the dump body 14 and the head end 34 may be pivotally connected to the main frame 12. The hoist cylinders 30 are retracted when the dump body 14 is in the downward position, and are extended by providing pressurized hydraulic fluid to the head ends 34 to extend piston rods (not shown) from the rod ends 32 and rotate the dump body 14 about the dump body shaft 16 toward the hoisted position.

Figure 2:
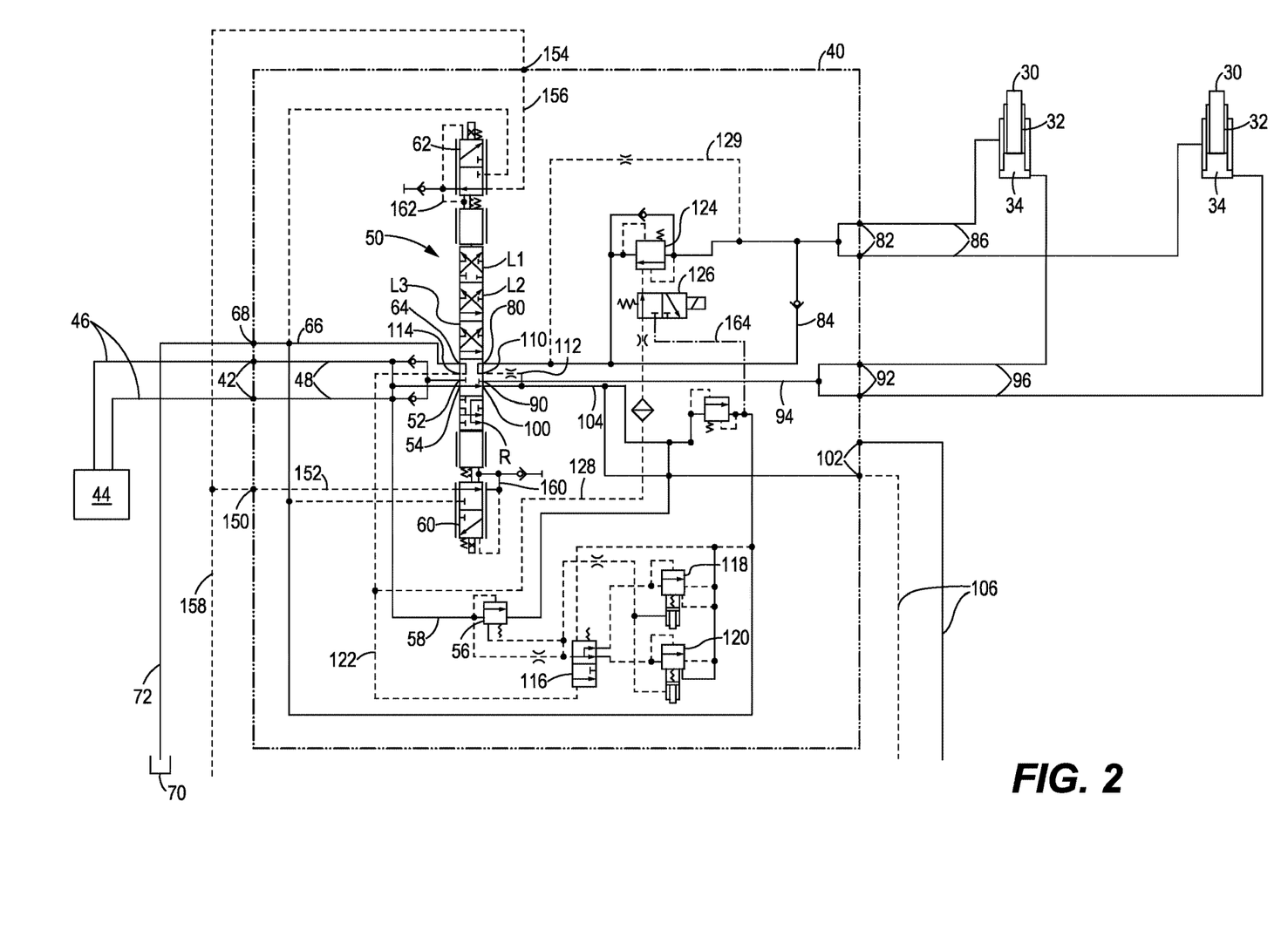
FIG. 2 is a schematic view of a hoist valve assembly in accordance with the present disclosure that may be implemented in the work machine of FIG. 1.

FIG. 2 illustrates a hoist valve assembly 40 that is configured and operates to control the extension and retraction of the hoist cylinders 30 to raise and lower, respectively, the dump body 14. The hoist valve assembly 40 may include a housing enclosing the various valve stems, springs, passages and other control components for controlling the flow of hydraulic fluid to and from the hoist cylinders 30. The hoist valve assembly 40 may include one or more high pressure (H.P.) fluid supply ports 42 fluidly connected to an H.P. fluid source 44 by H.P. fluid supply lines 46. H.P. fluid supply passages 48 may extend from the H.P. fluid supply ports 42 to a main control valve 50 and terminate at a first H.P. supply port 52 and a second H.P. supply port 54. The H.P. fluid supply passages 48 may also be fluidly connected to a dump valve 56 by a dump fluid passage 58. The main control valve 50 may be an 8-way, 5-position spool valve that is solenoid actuated via a lower position control valve 60 and a raise position control valve 62. The main control valve 50 further includes a valve drain port 64 fluidly connected by a drain passage 66 to a drain port 68 that in turn is fluidly connected to a low pressure (L.P.) tank or reservoir 70 by a drain line 72. A rod end fluid port 80 of the main control valve 50 may be connected to rod end ports 82 of the hoist valve assembly 40 by a rod end fluid passage 84, and rod end fluid lines 86 may fluidly connect the rod end ports 82 to the rod ends 32 of hoist cylinders 30. Similarly, a head end fluid port 90 may be connected to head end ports 92 by a head end fluid passage 94, and head end fluid lines 96 may fluidly connect the head end ports 92 to the head ends 34 of hoist cylinders 30.

A brake cooling fluid port 100 of the main control valve 50 may be connected to brake cooling ports 102 by a brake cooling fluid passage 104 to provide fluid to a brake cooling system (not shown) via brake cooling fluid lines 106. A rod end pressure relief port 110 may be fluidly connected to the brake cooling fluid passage 104 by a restricted passage 112 to provide drainage from the rod ends 32 when the main control valve 50 is in a neutral position N as shown in FIG. 2. A metered pilot pressure port 114 may be placed in fluid communication with a selector spool 116 that is associated with pilot relief valves 118, 120 by a selector pilot pressure passage 122, and with a counterbalance valve 124 via a solenoid-operated counterbalance shutoff valve 126 by a counterbalance pilot pressure passage 128. The counterbalance valve 124 may provide a return flow path for hydraulic fluid from the rod ends 32 to the rod end fluid port 80, and is controlled by head end and rod end pressure pilot signals to perform counterbalancing when raising the dump body 14 as discussed further below. A rod end restricted drain passage 129 may allow some flow of hydraulic fluid around the counterbalance valve 124.

While the hoist valve assembly 40 as illustrated and described herein provides hydraulic fluid to the brake cooling system under certain conditions where the hydraulic fluid would otherwise be drained from the hoist valve assembly 40, those skilled in the art will understand that the hydraulic fluid could be drained to any appropriate low pressure reservoir. For example, in other implementations, the hydraulic fluid may be drained to the tank 70. In further alternatives, the hydraulic fluid may be drained to a low pressure reservoir of another hydraulic system of the work machine 10. Such implementations and corresponding modifications to the elements and passages of the hoist valve assembly 40 to route hydraulic fluids will be apparent to those skilled in the art and are contemplated by the inventors.

Figure 3:
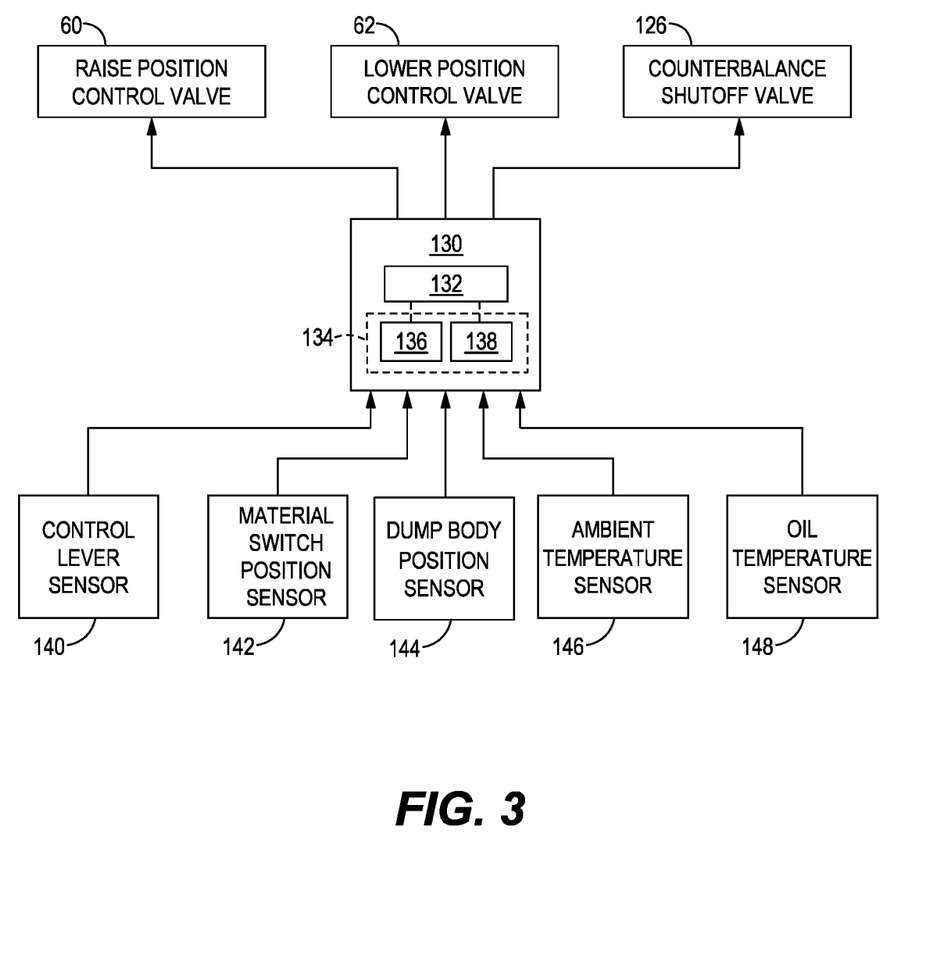
FIG. 3 is a schematic illustration of an exemplary controller and control components that may be implemented in the work machine if FIG. 1.

FIG. 3 illustrates an exemplary arrangement of electrical and control components of the work machine 10 that are capable of implementing hoist cylinder operation and counterbalance valve shutoff in the hoist valve assembly 40 in accordance with the present disclosure. A controller 130 may be capable of processing information received from monitoring and control devices using software stored at the controller 130, and outputting command and control signals to devices of the work machine 10. The controller 130 may include a processor 132 for executing a specified program, which controls and monitors various functions associated with the work machine 10. The processor 132 may be operatively connected to a memory 134 that may have a read only memory (ROM) 136 for storing programs, and a random access memory (RAM) 138 serving as a working memory area for use in executing a program stored in the ROM 136. Although the processor 132 is shown, it is also possible and contemplated to use other electronic components such as a microcontroller, an application specific integrated circuit (ASIC) chip, or any other integrated circuit device.

While the discussion provided herein relates to the functionality of the hoist valve assembly 40 including counterbalance valve shutoff, the controller 130 may be configured to control other aspects of operation of other systems of the work machine 10, including other hydraulic cylinders, propulsion, steering, braking, and the like. Moreover, the controller 130 may refer collectively to multiple control and processing devices across which the functionality of the work machine 10 may be distributed. Portions of the functionality of the work machine 10 may be performed at a controller of a remote computing device (not shown) that is operatively connected to the controller 130 by a communication link, such as in an autonomous vehicle with functions control at a central command station. The controllers may be operatively connected to exchange information as necessary to control the operation of the work machine 10. Other variations in consolidating and distributing the processing of the controller 130 as described herein are contemplated as having use in work machines 10 implementing hoist valve operation and counterbalance valve shutoff in accordance with the present disclosure.

The controller 130 may be operatively coupled to various input devices providing control signals to the controller 130 for the operation of hoist valve assembly 40 to extend and retract the hoist cylinders 30 and correspondingly raise and lower the dump body 14. A control lever sensor 140 may detect displacements of manual levers, joysticks or other inputs devices (not shown) manipulated by an operator to cause the hoist cylinders 30, respectively, to operate to raise and lower the dump body 14. The control lever sensor 140 may respond to the displacements by transmitting control lever sensor signals to the controller 130 having values corresponding to the displacement of the input device. In autonomous operation implementations, signals similar to the control lever sensor signals may be generated by an autonomous operation controller, generated by autonomous control software of the controller 130, or transmitted from a remote operations control center, for example. The controller 130 may respond to the control lever sensor signals by transmitting valve control signals to the solenoids or other actuation devices of the valves 60, 62, 126 to operate the hoist valve assembly 40 to extend or retract the hoist cylinders 30 as commanded.

As discussed previously, the characteristics of a material such as oil sand ore being handled by the work machine 10 may cause unstable operating conditions when the dump body 14 is raised to dump the material. Consequently, it may be advantageous provide an indication to the controller 103 as to whether the material may affect the operation of the hoist valve assembly 40. The cab 18 may have a material switch (not shown) with an accompanying material switch position sensor 142 that may detect displacements of the material switch by the operator. The material switch position sensor 142 may respond to the displacements by transmitting material switch position sensor signals to the controller 130 having values corresponding to the position of the material switch. In alternate embodiments, the work machine 10 may be provided with material sensors that can detect characteristics of the material in the dump body 14 to indicate whether instability will be an issue. The controller 130 may respond to the machine switch position signals by storing the current position of the material switch as an indication of whether the material being handled may cause unstable operating conditions.

As discussed below, some configurations of counterbalance valve shutoff strategy may be dependent on the position of the dump body 14, the ambient temperature of the work environment, the oil temperature at relevant locations in the hoist valve assembly 40 and the hoist cylinders 30, or a combination thereof. Consequently, a dump body position sensor 144 may be operatively connected to the controller 130 and operative to sense a parameter indicative of a dump body angle relative to the normal lowered position of the dump body 14 as shown in FIG. 1, and to direct dump body position sensor signals representative of the sensed dump body angle to the controller 130. An ambient temperature sensor 146 may be mounted on an exterior surface of the main frame, dump body 14, cab 18 or other appropriate location to sense the ambient temperature of the work environment in which the work machine 10 is operating, and to transmit ambient temperature sensor signals representative of the sensed ambient temperature to the controller 130. An oil temperature sensor 148 may be installed at an appropriate location to sense the temperature of the oil functioning as hydraulic fluid to operate the hoist cylinders 30. In one implementation, the oil temperature sensor 148 may be installed at the rod end 32 of one of the hoist cylinders 30 to sense the temperature of the fluid that may flow from the rod end 32 to the counterbalance valve 124. In other implementations, the oil temperature sensor 148 may be installed at an appropriate location within the hoist valve assembly 40. Further alternative positions are contemplated. In any appropriate position, the oil temperature sensor 148 is operatively connected to the controller 130 to direct oil temperature sensor signals representative of the sensed oil temperature to the controller 130.

Returning to FIG. 2, the controller 130 may transmit position control valve control signals to actuate the solenoids of the position control valves 60, 62 to move the spool of the main control valve 50 to various positions to extend and retract the hoist cylinders 30 and raise and lower the dump body 14. The lower position control valve 60 receives pilot supply fluid from a lower pilot supply port 150 via a lower pilot supply passage 152, and the raise position control valve 62 receives pilot supply fluid from a raise pilot supply port 154 via a raise pilot supply passage 156. The pilot supply ports 150, 154 are in fluid communication with a pilot fluid source (not shown) via a pilot fluid supply line 158. The position control valves 60, 62 have similar configurations with a normal open position wherein the pilot fluid passes through the position control valves 60, 62 to main valve pilot passages 160, 162 to act on corresponding ends of the spool of the main control valve 50. When both position control valves 60, 62 are in the open position, the main control valve 50 is in the neutral position N as shown in FIG. 2. In the neutral position N, the first H.P. supply port 52 and the head end fluid port 90 are blocked to maintain fluid within the head ends 34 of the hoist cylinders 30 and hold the dump body 14 in an essentially static position. The rod end fluid port 80 is placed in fluid communication with the brake cooling fluid passage 104 via the restricted passage 112 to allow some drainage of fluid from the rod ends 32. The second H.P. supply port 54 is also fluidly connected to the brake cooling fluid passage 104, and the selector pilot pressure passage 122 is fluidly connected to the drain passage 66 to reduce the pilot pressure on the selector spool 116.

To move the main control valve 50 to one of three available dump body lower positions L1, L2, L3 in response to control lever sensor signals from the control lever sensor 140, the controller 130 transmits proportional control signals to cause the solenoid of the lower position control valve 60 to move toward a second position wherein the main valve pilot passage 160 is fluidly connected to the drain passage 66. The reduced fluid pressure in the main valve pilot passage 160 allows fluid pressure of the main valve pilot passage 162 to force the spool of the main control valve 50 to the corresponding dump body lower position L1, L2, L3. In the same way, in response to control lever sensor signals from the control lever sensor 140 to raise the dump body 14, the controller 130 transmits control signals to cause the solenoid of the raise position control valve 62 to move toward its second position to fluidly connect the main valve pilot passage 162 to the drain passage 66 and reduce the fluid pressure in the main valve pilot passage 162 to allow the fluid pressure of the main valve pilot passage 160 to force the spool of the main control valve 50 to a dump body raise position R.

The dump body lower positions L1, L2, L3 control the rate at which the hoist cylinders 30 retract and the dump body 14 is lowered. The first dump body lower position L1 may be a power down position with a maximum rate of descent of the dump body 14. In this position, the rod end fluid passage 84 is placed in fluid communication with the fluid supply passages 48 to deliver pressurized fluid to the rod ends 32 of the hoist cylinders 30, and the head end fluid passage 94 is placed in fluid communication with the drain passage 66 to drain fluid from the head ends 34 of the hoist cylinders 30 to the tank 70. The selector pilot pressure passage 122 is also fluidly connected to the drain passage 66 so that the selector spool 116 is spring biased to a position to distribute metered fluid from the dump fluid passage 58 to both pilot relief valves 118, 120. At the same time, the head end pressure pilot signal to the counterbalance valve 124 via the counterbalance pilot pressure passage 128 is reduced. The second H.P. supply port 54, the brake cooling fluid port 100 and the rod end pressure relief port 110 are blocked to prevent fluid flow to the brake cooling fluid passage 104. The second dump body lower position L2 may be a float position where the dump body 14 is lowered at a slower rate. The rod end and the head end connections are similar to the position L1, but the brake cooling fluid passage 104 is fluidly connected to the fluid supply passages 48 to divert a portion of the hydraulic fluid away from the rod ends 32 and to the brake cooling system, thereby slowing the retraction of the hoist cylinders 30. The third dump body lower position L3 may be a snub position where a greater portion of the hydraulic fluid is diverted away from the rod ends 32 to further reduce the rate of descent of the dump body 14 and manage the impact as the dump body 14 reaches the fully lowered position of FIG. 1.

The main control valve 50 in the illustrated embodiment has the single dump body raise position R, but additional raise positions are contemplated if necessary for greater control of the extension of the hoist cylinders 30 to raise the dump body 14 in a particular implementation of the hoist valve assembly 40. In the dump body raise position R as illustrated, the head end fluid passage 94 is placed in fluid communication with the fluid supply passages 48 to deliver pressurized fluid to the head ends 34 and extend the hoist cylinders 30, and the rod end fluid passage 84 is placed in fluid communication with the brake cooling fluid passage 104 to drain fluid from the rod ends 32 of the hoist cylinders 30 to the brake cooling system. The second H.P. supply port 54, the valve drain port 64 and the restricted passage 112 are blocked. The first H.P. supply port 52 is fluidly connected to the metered pilot pressure port 114 to provide pilot signals corresponding to the head end pressure in the head end fluid passage 94 to the selector spool 116 via the selector pilot pressure passage 122 and to the counterbalance valve 124 via the counterbalance pilot pressure passage 128. The pilot signal to the selector spool 116 shifts the selector spool 116 to a raise position wherein the dump fluid passage 58 is fluidly connected only to the raise pilot relief valve 120.

The head end pressure pilot signal from the counterbalance pilot pressure passage 128 acts on the counterbalance valve 124 in the same direction as a rod end pressure pilot signal when the counterbalance shutoff valve 126 is in the open position shown in FIG. 2. A counterbalance valve outlet pressure pilot signal and a biasing member such as a spring may act in the opposite direction as the head end and rod end pressure pilot signals. With this configuration, pressure spikes in either the head ends 34 or the rod ends 32 of the hoist cylinders 30 while raising the dump body 14 will cause the counterbalance valve 124 to open and drain fluid from the rod ends 32 to the brake cooling system. Under certain operating conditions such as those discussed further below, it may be desired to remove the head end pressure pilot signal from the counterbalance valve 124 and allow the counterbalance valve 124 to function as a rod end pressure relief valve that is only influenced by the rod end pressure pilot signal from the rod ends 32. During these conditions, the controller 130 may transmit solenoid valve control signals to the counterbalance shutoff valve 126 to cause the counterbalance shutoff valve 126 to move to a shutoff position where the counterbalance pilot pressure passage 128 is blocked and the portion of the pilot pressure passage 128 between the counterbalance valve 124 and the counterbalance shutoff valve 126 is fluidly connected to the drain passage 66 via a shutoff drain passage 164 to drain the head end pressure pilot fluid to the tank 70. With the counterbalance shutoff valve 126 in the shutoff position, the counterbalance valve 124 will only open during raising of the dump body 14 in the event of pressure supplied from the rod ends 32.

INDUSTRIAL APPLICABILITY

Figure 4:
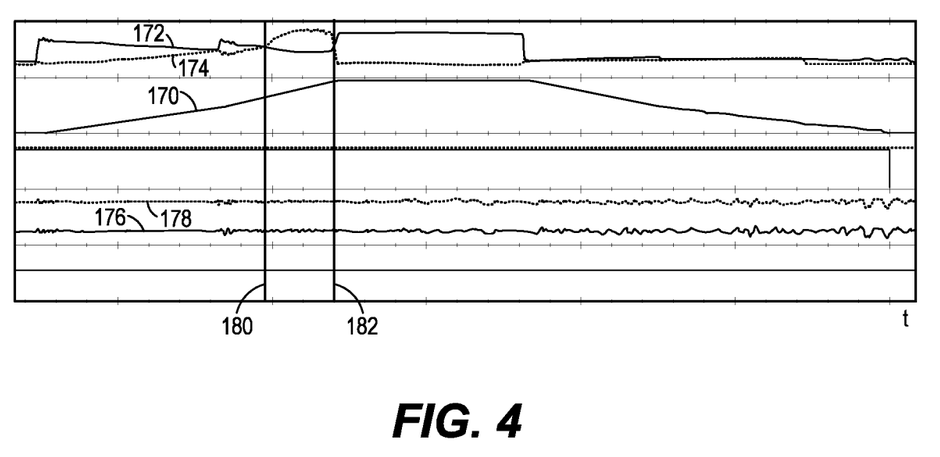
FIG. 4 is a graph of various operating parameters of the work machine of FIG. 1 during a load dump cycle of a dump body of the work machine at a temperature greater than a threshold instability temperature and with counterbalancing active.

FIG. 4 provides a graphic illustration of various parameters during the operation of the hoist valve assembly 40 to dump a load from the dump body 14 with the counterbalance shutoff valve 126 in its normal open position to communicate the head end pressure pilot signal to the counterbalance valve 124. In this example, the work machine 10 is dumping a sticky payload of a material such as oil sand ore at an ambient temperature in which the pressurized fluid flows freely through the hoist cylinders 30 and the hoist valve assembly 40. The X-axis represents time during which the dump body 14 is raised, dumps the load, and is lowered back to its normal position by the hoist cylinders 30. A dump body angle curve 170 illustrates the dump body angle that would be indicated by the dump body position sensor 144 during the load dump cycle, a head end pressure curve 172 and a rod end pressure curve 174 illustrate the pressures in the head ends 34 and the rod ends 32, respectively, of the hoist cylinders 30, and a vertical acceleration curve 176 and a longitudinal acceleration curve 178 indicating acceleration of the main frame 12 in the respective directions.

When the main control valve 50 moves to the raise position R and pressurized fluid flows to the head ends 34 of the hoist cylinders 30, the hoist cylinders 30 extend and increase the dump body angle. During the initial stage, the head end pressure is greater than the rod end pressure as the hydraulic fluid fills the head ends 34 to raise the dump body 14 and the counterbalance valve 124 opens to drain fluid from the rod ends 32 to the brake cooling system. Some pressure oscillation occurs as the dump body angle approaches an over-center load angle 180, but the counterbalance valve 124 controls the rod end pressure to minimize the vertical and longitudinal accelerations of the main frame 12. In one implementation, the over-center load angle 180 occurs at approximately 70% of the maximum dump body raise angle of the dump body 14, and may be within a range from 38° to 40°. When the dump body 14 reaches the over-center load angle 180, the center of mass of the combined dump body 14 and load of material passes the dump body shaft 16 and switches the direction of the moment about the dump body shaft 16. The load on the hoist cylinders 30 switches from a compressive load to a tensile load that must be resisted by the rod ends 32. The rod end pressure increases while the head end pressure decreases such that the counterbalance valve 124 moves toward a throttled position to restrict the fluid flow out of the rod ends 32 and prevent rapid rotation of the dump body 14 about the dump body shaft 16. Eventually, the load of material slides off the surface of the dump body 14 at a load detachment angle 182. The load on the hoist cylinders 30 switches back to a compressive load that increases the head end pressure and decreases the rod end pressure.

Figure 5:
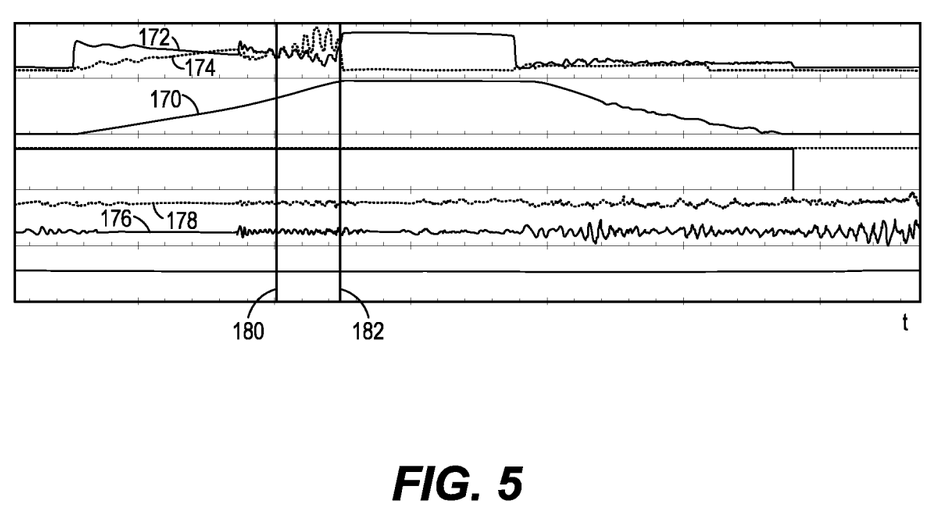
FIG. 5 is the graph of FIG. 4 during a load dump cycle of the dump body of the work machine at a temperature less than the threshold instability temperature and with counterbalancing active.

The described operation of the hoist valve assembly 40, and in particular the counterbalance valve 124, can be adversely affected in cold temperatures that make the hydraulic fluid resistant to flow. FIG. 5 illustrates graphs similar to FIG. 4 where the work machine 10 is operating at an ambient temperature of approximately −14° C. Due to the flow resistance, there is a lag in pressure changes in the head ends 34 being communicated to the counterbalance valve 124 in the head end pressure pilot signal, and a corresponding lag in the response of the counterbalance valve 124. As a consequence, the pressure oscillations and main frame accelerations prior to the over-center load angle 180 are greater as the counterbalance valve 124 is slow in responding. Further pressure oscillations of greater magnitude occur after the dump body 14 passes the over-center load angle 180 and create accelerations of the main frame 12 that potentially cause jarring effects for the work machine 10 and the operator.

In the hoist valve assembly 40 in accordance with the present disclosure, the counterbalance shutoff valve 126 is controlled during low temperatures or other unstable operating conditions to remove the head end pressure pilot signal from the counterbalance valve 124 so that only the rod end pressure pilot signal acts on the counterbalance valve 124 to regulate the fluid pressure in the rod ends 32. As discussed above, the solenoid of the counterbalance shutoff valve 126 is actuated to move the counterbalance shutoff valve 126 to a shutoff position where the counterbalance pilot pressure passage 128 is blocked and the portion of the pilot pressure passage 128 between the counterbalance valve 124 and the counterbalance shutoff valve 126 is fluidly connected to the drain passage 66 to drain the pilot fluid to the tank 70. At low rod end pressures, the counterbalance shutoff valve 126 will remain closed and a small amount of hydraulic fluid can flow through the rod end restricted drain passage 129 to the brake cooling system. At higher rod end pressures, the rod end pressure pilot signal opens the counterbalance valve 124 to drain hydraulic fluid from the rod ends 32 to the brake cooling system through the counterbalance valve 124. After the unstable operating conditions are no longer present (e.g., ambient temperature rises above a threshold instability temperature), the solenoid of the counterbalance shutoff valve 126 can be deactivated to return the counterbalance shutoff valve 126 to its normal position so that the head end pressure pilot signal can act on the counterbalance valve 124 in conjunction with the rod end pressure pilot signal.

Figure 6:
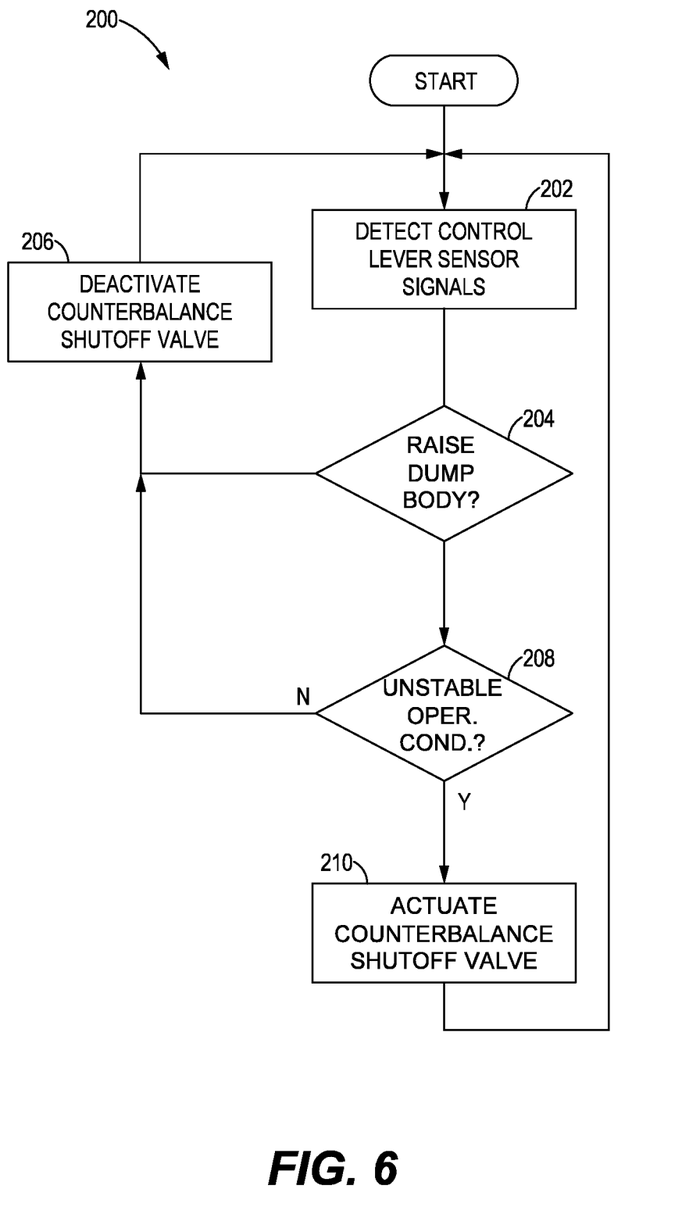
FIG. 6 is a flow diagram of an exemplary counterbalance valve shutoff routine in accordance with the present disclosure that may be implemented in the work machine of FIG. 1.

FIG. 6 illustrates an exemplary counterbalance valve shutoff routine 200 that may be executed by the controller 130 to identify unstable operating conditions and actuate the counterbalance shutoff valve 126 in response. The counterbalance valve shutoff routine 200 may begin at a block 202 where the controller 130 detects control lever sensor signals from the control lever sensor 140 or other source indicating displacement of the input device by the operator of the work machine 10. After detection of the control lever sensor signals, control may pass to a block 204 where the controller 130 determines from the control lever sensor signals whether the work machine 10 is commanded to raise the dump body 14. If the control lever sensor signals are not signals to raise the dump body 14, control may pass to a block 206 where the controller 130 may control the solenoid of the counterbalance shutoff valve 126 to deactivate and allow the counterbalance shutoff valve 126 to move to its normal position or to maintain the counterbalance shutoff valve 126 in the normal position if it is already set in the normal position. After ensuring the counterbalance shutoff valve 126 is in the correct position, control may pass back to the block 202 to monitor for subsequent control lever sensor signals.

If the control lever sensor signals are signals to raise the dump body 14 at the block 204, control may pass to a block 208 where the controller 130 may determine whether the work machine 10 is operating in unstable operating conditions. As discussed above, unstable operating conditions can include operating the work machine 10 at an ambient temperature or an oil temperature that is below a threshold instability temperature and fluid flow is affected, raising the dump body 14 beyond the over-center load angle 180, or combinations of temperature, dump body angle and other operating parameters. If the controller 130 determines that the work machine 10 is not operating in unstable conditions at the block 208, control may pass to the block 206 to ensure the counterbalance shutoff valve 126 is in the normal position and then to the block 202 to monitor for subsequent control lever sensor signals. If the controller 130 determines that the work machine 10 is operating in unstable conditions at the block 208, control may pass to a block 210 where the controller 130 may actuate the solenoid of the counterbalance shutoff valve 126 to move the counterbalance shutoff valve 126 to the shutoff position and disconnect the head end pressure pilot signal from the counterbalance valve 124 and drain the pilot passage to the tank 70. After moving the counterbalance shutoff valve 126 to the shutoff position, control may pass back to the block 202 to monitor for subsequent control lever sensor signals.

Figure 7:
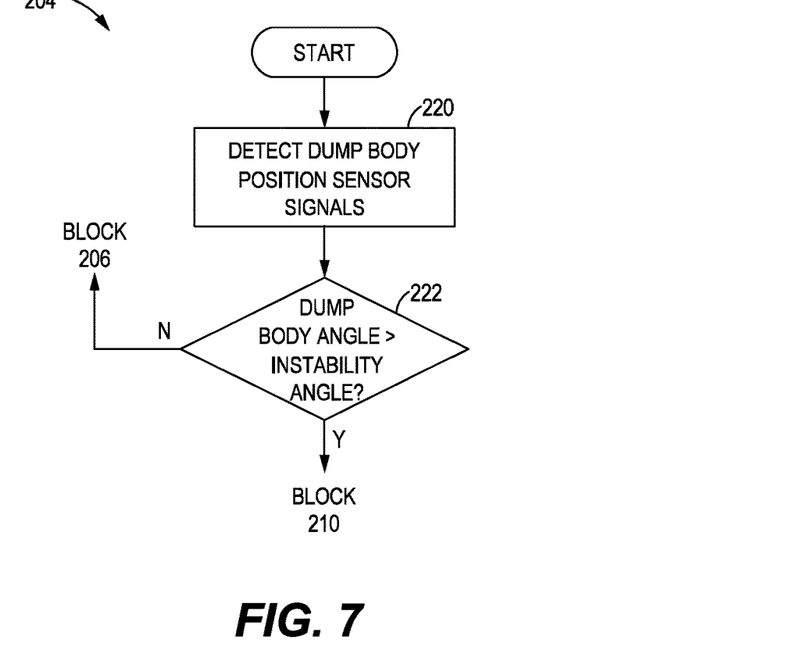
FIG. 7 is a flow diagram of an implementation of an unstable operation condition block of the counterbalance valve shutoff routine of FIG. 6.

FIGS. 7-10 illustrate several alternative strategies for the controller 130 to determine when the work machine 10 is subjected to unstable operating conditions that may necessitate counterbalance shutoff in accordance with the present disclosure. FIG. 7 illustrates an implementation where the work machine 10 may be dumping sticky material such as oil sand ore where the nature of the material may cause jarring of the work machine 10 regardless of the current ambient temperature or oil temperature. In this embodiment, the processing at the block 204 may begin at a block 220 where the controller 130 detects dump body position sensor signals from the dump body position sensor 144. After detecting the signals, control may pass to a block 222 where the controller 130 determines whether a current dump body angle indicated by the signals is greater than a threshold instability angle that may be less than but close to the over-center load angle 180. The threshold instability angle may be used as a shutoff reference if it is desirable to execute counterbalance shutoff prior to reaching the over-center load angle 180. If the dump body angle is less than the threshold instability angle, the work machine 10 has not yet reached an unstable operating condition, and control may pass back to the block 206 for execution as described above. If the dump body angle is greater than the threshold instability angle, the work machine 10 has reached the unstable operating condition, and control may pass to the block 210 to actuate the counterbalance shutoff valve 126 to the shutoff position.

Figure 8:
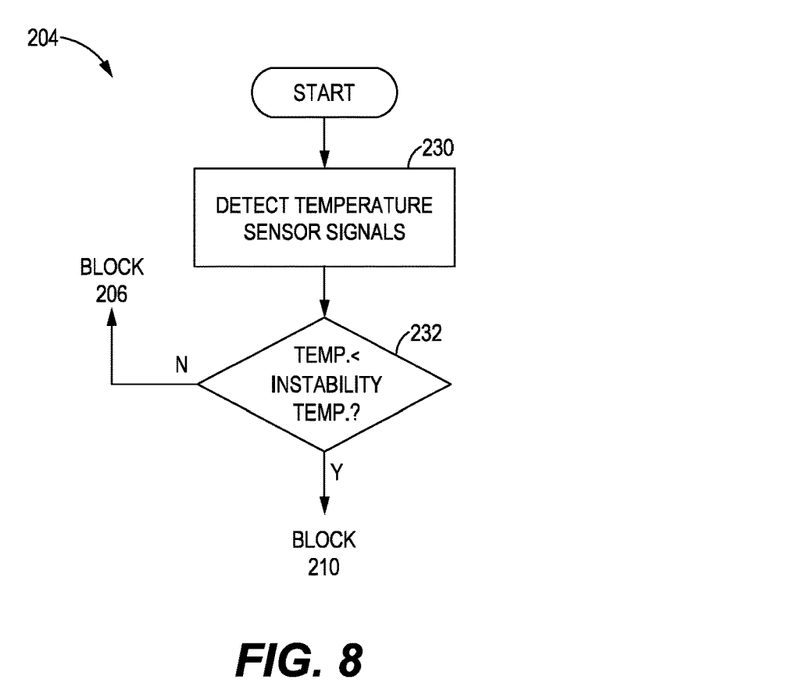
FIG. 8 is a flow diagram of an alternative implementation of the unstable operation condition block of the counterbalance valve shutoff routine of FIG. 6.

FIG. 8 illustrates an implementation where the work machine 10 may operate in cold environments where instability can occur at low temperatures regardless of the nature of the work material loaded in the dump body 14. The processing at the block 204 may begin at a block 230 where the controller 130 detects temperature sensor signals from a relevant temperature sensor such as the ambient temperature sensor 146 or the oil temperature sensor 148. The sensed temperature for a given implementation may be the temperature that most closely accurately correlates to the unstable operating conditions for the work machine 10. After detecting the temperature sensor signals, control may pass to a block 232 where the controller 130 determines whether a current sensed temperature indicated by the signals is greater than a threshold instability temperature. If the sensed temperature is greater than the threshold instability temperature, the flow of hydraulic fluid will not be adversely affected, and control may pass back to the block 206. If the sensed temperature is less than the threshold instability temperature, the work machine 10 is operating in unstable operating conditions, and control may pass to the block 210 to actuate the counterbalance shutoff valve 126 to the shutoff position.

Figure 9:
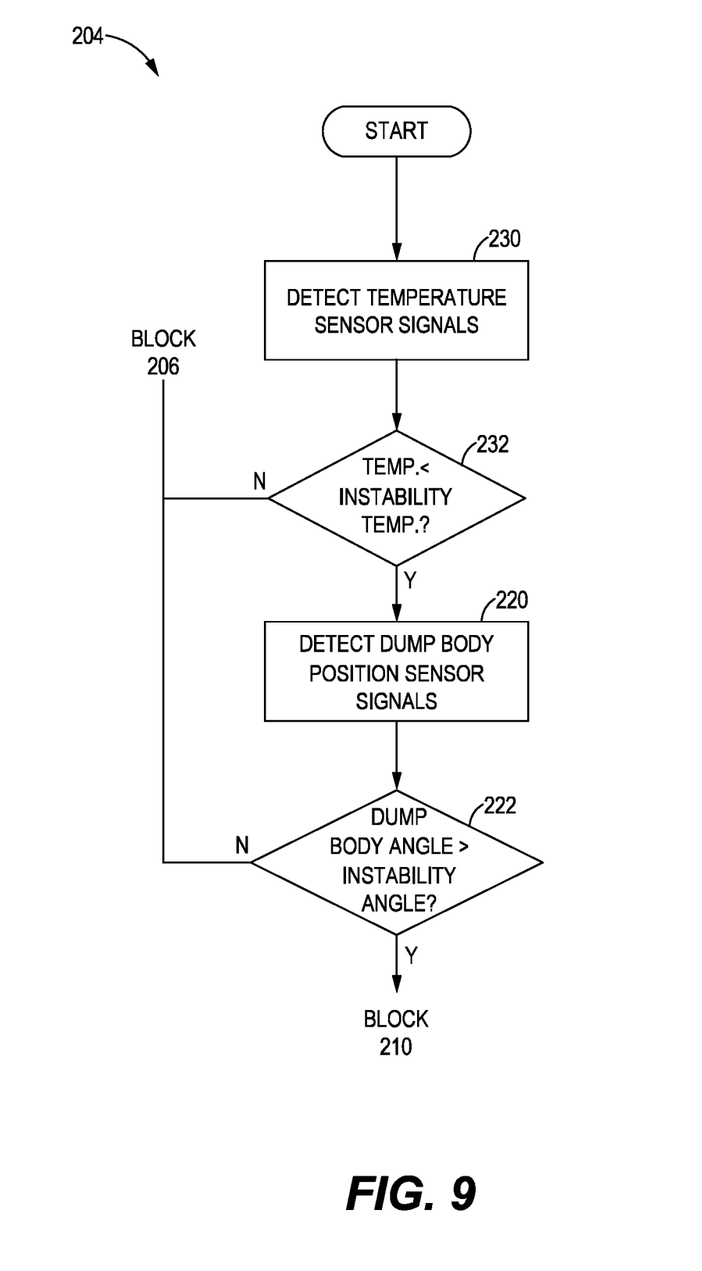
FIG. 9 is a flow diagram of a further alternative implementation of the unstable operation condition block of the counterbalance valve shutoff routine of FIG. 6.

FIG. 9 provides an implementation that may be a combination of the implementations of FIGS. 7 and 8 where unstable operating conditions occur when the work machine 10 is operating at low temperatures and the dump body 14 is being raised and is approaching or past the over-center load angle 180. In this embodiment, the controller 130 may initially execute blocks 230, 232 to determine whether the current sensed temperature is less than the threshold instability temperature, and control passes back to the block 206 if the sensed temperature is greater. If the sensed temperature is less than the threshold instability temperature, then control may pass to the blocks 220, 222 to determine whether the dump body angle is greater than the threshold instability angle. Control will pass back to the block 206 if the dump body angle is less than the threshold instability angle, and will pass back to the block 210 if the dump body angle is greater than the threshold instability angle.

Figure 10:
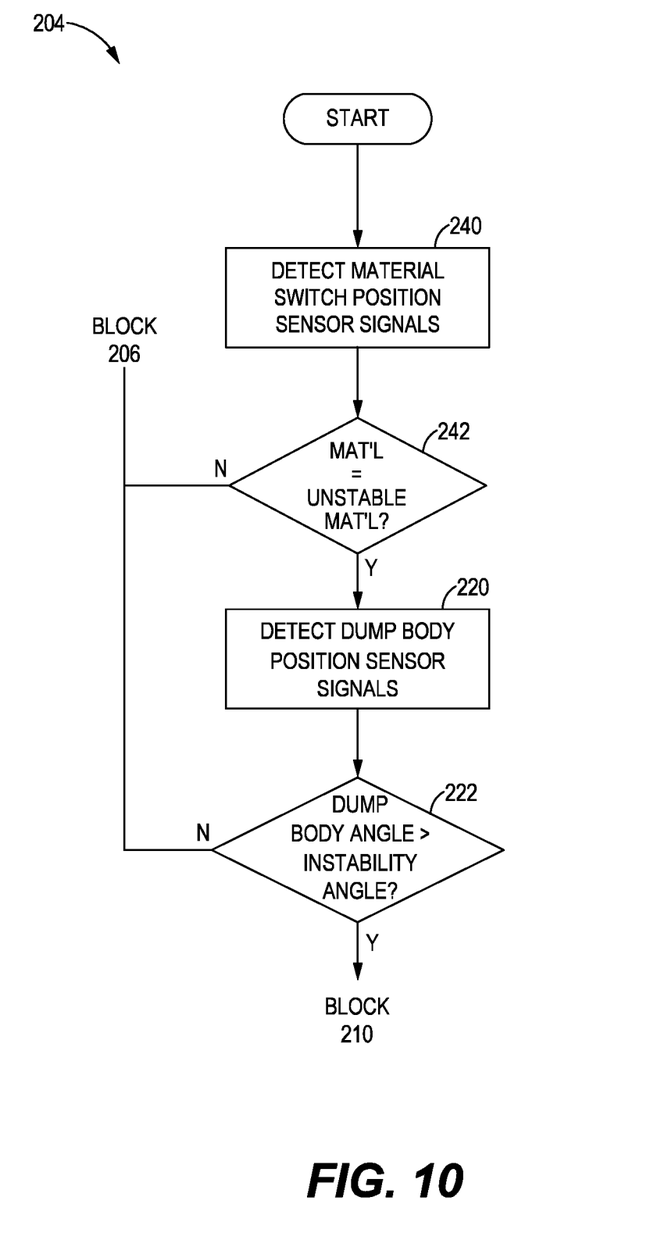
FIG. 10 is a flow diagram of a still further alternative implementation of the unstable operation condition block of the counterbalance valve shutoff routine of FIG. 6.

FIG. 10 illustrates an implementation where unstable operating conditions may occur when the work machine 10 is handling materials such as oil sand ores that can create a loaf that adheres to the surface of the dump body 14 beyond the over-center load angle 180, or can cause the shift from the compressive push load to the tensile pull load to occur before the dump body 14 reaches the over-center load angle 180. In this embodiment, the controller 130 detects the material switch position sensor signals from the material switch position sensor 142 at a block 240. Block 240 may be executed in real time, or the controller 130 may retrieve from memory 134 values of the material switch position sensor signals that were received from the material switch position sensor 142 the last time the material switch position sensor 142 detected a change in the position of the material switch. Control then passes to a block 242 where the controller 130 determines whether the material or material characteristics corresponding to the material switch position correspond to a potentially unstable material. If the material indicated by the material switch position is not an unstable material, control may pass back to the block 206. If the controller 130 determines that the material switch position indicates an unstable material, then control may pass to the blocks 220, 222 to determine whether the dump body angle is greater than the threshold instability angle. Control will pass back to the block 206 if the dump body angle is less than the threshold instability angle, and will pass back to the block 210 if the dump body angle is greater than the threshold instability angle. In some implementations where the character of the material in evaluate, the ambient temperature or oil temperature may also be considered in determining when to actuate the counterbalance shutoff valve 126.

The hoist valve assembly 40 and the counterbalance valve shutoff routine 200 of the work machine 10 in accordance with the present disclosure provide an effective solution to instability that occurs with a counterbalance valve in certain operating conditions. The counterbalance shutoff valve 126 constitutes a single control element actuated by the controller 130 to disengage counterbalancing in the hoist valve assembly 40, which stands in contrast to systems such as the regenerative hydraulic circuit of the Ramler et al. patent that implements many controlled elements in addition to a main control valve that must be controlled by a controller to control operation of the circuit. At the same time, the counterbalance valve shutoff routine 200 can be configured as necessary for a particular implementation in a work machine 10 to determine when the work machine 10 is operating in unstable operating conditions. In most implementations, the controller 130 may make use of sensor information that is already available based on the operation and control of other systems of the work machine 10. In this way, potentially adverse jarring of the work machine 10 can be reduced, thereby reducing maintenance on the work machine 10 and extending its useful life.

The hoist valve assembly 40 is illustrated and described herein as being implemented to control operation of the hoist cylinders 30. However, those skilled in the art will understand that the hoist valve assembly 40 and the counterbalance valve shutoff routine 200 may be implemented to control the operation of any hydraulic cylinder in a work machine where counterbalancing during extension or retraction of the hydraulic cylinder provides benefits and counterbalance shutoff is desired during unstable operating conditions. Such implementations could include boom cylinders, stick cylinders and/or implement cylinders in excavators, lift cylinders in loaders and bulldozers, and the like. Such implementations are contemplated by the inventors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A hoist valve assembly for a cylinder of a work machine having a head end and a rod end, the hoist valve assembly comprising:
    a main control valve having a raise position wherein the head end of the cylinder is in fluid communication with a pressurized fluid source and is in fluid communication with a counterbalance pilot pressure passage to transmit a head end pressure pilot signal, and wherein the rod end of the cylinder is in fluid communication with a low pressure reservoir;
    a counterbalance valve positioned in a fluid flow path between the rod end of the cylinder and the main control valve, wherein the counterbalance valve is biased to a closed position that prevents fluid flow from the rod end to the low pressure reservoir and has an open position where the rod end of the cylinder is in fluid communication with the low pressure reservoir, and wherein a rod end pressure pilot signal from the rod end and the head end pressure pilot signal from the head end apply a force to the counterbalance valve in a direction of the open position; and
    a counterbalance shutoff valve positioned along the counterbalance pilot pressure passage between the main control valve and the counterbalance valve, wherein the counterbalance shutoff valve has a normal position where the head end pressure pilot signal applies the force to the counterbalance valve and a shutoff position where the head end pressure pilot signal is blocked from the counterbalance valve.

2. The hoist valve assembly according to claim 1, wherein a portion of the counterbalance pilot pressure passage between the counterbalance valve and the counterbalance shutoff valve is in fluid communication with the low pressure reservoir when the counterbalance shutoff valve is in the shutoff position.

3. The hoist valve assembly according to claim 1, wherein the counterbalance shutoff valve is biased toward the normal position.

4. The hoist valve assembly according to claim 3, the counterbalance shutoff valve comprises an actuator that is actuated to move the counterbalance shutoff valve from the normal position to the shutoff position.

5. The hoist valve assembly according to claim 4, wherein the actuator comprises a solenoid actuator.

6. The hoist valve assembly according to claim 1, wherein the main control valve has a main control valve normal position where the head end of the cylinder is not in fluid communication with the pressurized fluid source, the rod end of the cylinder is in fluid communication with the low pressure reservoir via a restricted passage, and the counterbalance pilot pressure passage is in fluid communication with the low pressure reservoir.

7. The hoist valve assembly according to claim 1, comprising a counterbalance valve outlet pilot pressure passage at an outlet of the counterbalance valve to transmit a counterbalance valve outlet pressure pilot signal to apply a force to the counterbalance valve in the direction of the normal position.

8. A work machine comprising:
a main frame;
a dump body pivotally connected to the main frame by a dump body shaft;
a hoist cylinder having a head end and a rod end and being pivotally connected to the main frame and to the dump body such that the hoist cylinder extends to rotate the dump body about the dump body shaft to raise the dump body and retracts to lower the dump body during a load dump cycle;
a hoist valve assembly comprising:
a main control valve having a raise position wherein the head end of the hoist cylinder is in fluid communication with a pressurized fluid source and is in fluid communication with a counterbalance pilot pressure passage to transmit a head end pressure pilot signal, and wherein the rod end of the hoist cylinder is in fluid communication with a low pressure reservoir,
a counterbalance valve positioned in a fluid flow path between the rod end of the hoist cylinder and the main control valve, wherein the counterbalance valve is biased to a closed position that prevents fluid flow from the rod end to the low pressure reservoir and has an open position where the rod end of the hoist cylinder is in fluid communication with the low pressure reservoir, and wherein a rod end pressure pilot signal from the rod end and the head end pressure pilot signal from the head end apply a force to the counterbalance valve in a direction of the open position, and
a counterbalance shutoff valve positioned along the counterbalance pilot pressure passage between the main control valve and the counterbalance valve, wherein the counterbalance shutoff valve has a normal position where the head end pressure pilot signal applies the force to the counterbalance valve and a shutoff position where the head end pressure pilot signal is blocked from the counterbalance valve, and wherein the counterbalance shutoff valve comprises
an actuator that is actuated to move the counterbalance shutoff valve from the normal position to the shutoff position; and
a controller operatively connected to the actuator of the counterbalance shutoff valve, the controller being programmed to:
determine whether the work machine is operating under unstable operating conditions, and
actuate the actuator of the counterbalance shutoff valve to move the counterbalance shutoff valve to the shutoff position in response to determining that the work machine is operating under the unstable operating conditions.

9. The work machine according to claim 8, comprising a control lever sensor operatively connected to the controller, and wherein the controller is programmed to:
detect control lever sensor signals from the control lever sensor, wherein the control lever sensor signals indicate one of to lower the dump body, to raise the dump body and to hold a position of the dump body;
determine whether the control lever sensor signals indicate to raise the dump body; and
determine whether the work machine is operating under the unstable operating conditions in response to determining that the control lever sensor signals indicate to raise the dump body.

10. The work machine according to claim 8, comprising a dump body position sensor operatively connected to the controller, and wherein the controller is programmed to:
detect dump body position sensor signals from the dump body position sensor, wherein the dump body position sensor signals indicate a dump body angle of the dump body;
determine the dump body angle based on the dump body position sensor signals; and
determine that the work machine is operating under the unstable operating conditions when the dump body angle is greater than a threshold instability angle.

11. The work machine according to claim 8, comprising a temperature sensor operatively connected to the controller, and wherein the controller is programmed to:
detect temperature sensor signals from the temperature sensor;
determine a sensed temperature based on the temperature sensor signals; and
determine that the work machine is operating under the unstable operating conditions when the sensed temperature is less than a threshold instability temperature.

12. The work machine according to claim 11, wherein the sensed temperature is an ambient temperature of an environment in which the work machine is operating.

13. The work machine according to claim 11, wherein the sensed temperature is an oil temperature of a hydraulic fluid in the head end of the hoist cylinder.

14. The work machine according to claim 8, comprising a dump body position sensor and a temperature sensor operatively connected to the controller, and wherein the controller is programmed to:
detect temperature sensor signals from the temperature sensor;
determine a sensed temperature based on the temperature sensor signals;
detect dump body position sensor signals from the dump body position sensor, wherein the dump body position sensor signals indicate a dump body angle of the dump body;

determine the dump body angle based on the dump body position sensor signals;

compare the sensed temperature to a threshold instability temperature;

compare the dump body angle to a threshold instability angle in response to determining that the sensed temperature is less than the threshold instability temperature; and determine that the work machine is operating under the unstable operating conditions when the dump body angle is greater than the threshold instability angle.

15. A method for shutting off counterbalancing during extension of a hydraulic cylinder of a work machine, where the work machine includes a hoist valve assembly having a main control valve with a raise position wherein a head end of the hydraulic cylinder is in fluid communication with a pressurized fluid source and is in fluid communication with a counterbalance pilot pressure passage to transmit a head end pressure pilot signal, and wherein a rod end of the hydraulic cylinder is in fluid communication with a low pressure reservoir, the hoist valve assembly also including a counterbalance valve positioned in a fluid flow path between the rod end of the hydraulic cylinder and the main control valve, wherein the counterbalance valve is biased to a closed position that prevents fluid flow from the rod end to the low pressure reservoir and has an open position where the rod end of the hydraulic cylinder is in fluid communication with the low pressure reservoir, and wherein a rod end pressure pilot signal from the rod end and the head end pressure pilot signal from the head end apply a force to the counterbalance valve in a direction of the open position, and wherein the hoist valve assembly further includes a counterbalance shutoff valve positioned along the counterbalance pilot pressure passage between the main control valve and the counterbalance valve, wherein the counterbalance shutoff valve has a normal position where the head end pressure pilot signal applies the force to the counterbalance valve and a shutoff position where the head end pressure pilot signal is blocked from the counterbalance valve, and wherein the counterbalance shutoff valve comprises an actuator that is actuated to move the counterbalance shutoff valve from the normal position to the shutoff position, the method for shutting off counterbalancing comprising:

determining whether the work machine is commanded to move the main control valve to the raise position;

determining whether the work machine is operating under unstable operating conditions in response to determining that the work machine is commanded to move to the raise position; and actuating the actuator of the counterbalance shutoff valve to move the counterbalance shutoff valve to the shutoff position in response to determining that the work machine is operating under the unstable operating conditions.

16. The method for shutting off counterbalancing according to claim 15, wherein determining whether the work machine is being commanded to move the main control valve to the raise position comprises:

determining whether the work machine is commanded to extend the hydraulic cylinder; and determining that the work machine is commanded to move the main control valve to the raise position when the work machine is commanded to extend the hydraulic cylinder.

17. The method for shutting off counterbalancing according to claim 15, wherein the work machine includes a main frame, a dump body pivotally connected to the main frame by a dump body shaft, and wherein the hydraulic cylinder is pivotally connected to the main frame and to the dump body such that the hydraulic cylinder extends to rotate the dump body about the dump body shaft to raise the dump body and retracts to lower the dump body during a load dump cycle, wherein determining whether the work machine is operating under the unstable operating conditions comprises:

determining a dump body angle of the dump body relative to the main frame; and determining that the work machine is operating under the unstable operating conditions when the dump body angle is greater than a threshold instability angle.

18. The method for shutting off counterbalancing according to claim 15, wherein determining whether the work machine is operating under the unstable operating conditions comprises:

determining a sensed temperature for the work machine; and determining that the work machine is operating under the unstable operating conditions when the sensed temperature is less than a threshold instability temperature.

19. The method for shutting off counterbalancing according to claim 18, wherein the sensed temperature is an ambient temperature of an environment in which the work machine is operating.

20. The method for shutting off counterbalancing according to claim 15, wherein the work machine includes a main frame, a dump body pivotally connected to the main frame by a dump body shaft, and wherein the hydraulic cylinder is pivotally connected to the main frame and to the dump body such that the hydraulic cylinder extends to rotate the dump body about the dump body shaft to raise the dump body and retracts to lower the dump body during a load dump cycle, wherein determining whether the work machine is operating under the unstable operating conditions comprises:

determine a sensed temperature for the work machine;

determine a dump body angle of the dump body relative to the main frame;

comparing the sensed temperature to a threshold instability temperature;

comparing the dump body angle to a threshold instability angle in response to determining that the sensed temperature is less than the threshold instability temperature; and determining that the work machine is operating under the unstable operating conditions when the dump body angle is greater than the threshold instability angle.

\* \* \* \* \*